United States Patent [19]
Aya et al.

[11] 3,899,472
[45] Aug. 12, 1975

[54] CHELATING RESIN AND PROCESS FOR PREPARING THE SAME

[75] Inventors: Toshihiko Aya; Kazumasa Chiba; Zenzi Izumi, all of Nagoya, Japan

[73] Assignee: Toray Industries, Inc., Tokyo, Japan

[22] Filed: Nov. 18, 1974

[21] Appl. No.: 524,353

[30] Foreign Application Priority Data
Nov. 21, 1973 Japan.............................. 48-130083
Mar. 5, 1974 Japan.............................. 49-24736

[52] U.S. Cl...... 260/80.78; 260/88.2 S; 260/93.5 A
[51] Int. Cl.².................. C08F 210/00; C08F 212/00
[58] Field of Search........ 260/88.2 S, 93.5 A, 80.78

[56] References Cited
UNITED STATES PATENTS
3,645,997   2/1972   D'Alelio.............................. 260/88.1
FOREIGN PATENTS OR APPLICATIONS
707,647   4/1954   United Kingdom........... 260/88.2 S OTHER PUBLICATIONS
G. Kuehn et al., Makromol Chem. 108, 84-94, (1967).
S. Chaberekto et al., J. Amer. Chem. Soc., 75, (1953), 2888-2892.

Primary Examiner—Joseph L. Schofer
Assistant Examiner—Herbert J. Lilling

[57] ABSTRACT

A novel, easily regeneratable, high-performance chelating resin and process for preparing the same. More in particular, a crosslinked polymer consisting mainly of an aromatic vinyl monomer having a polyalkylene polyamine functional group containing an iminodipropionic acid group or an iminodi-α-methylpropionic acid group, and process for preparing the same.

Because chelating resins of the present invention have pendant functional groups attached pendantly thereto, at least one iminodipropionic acid group or iminodi-α-methylpropionic acid group and at least two nitrogen atoms, it has a very large capacity for adsorbing heavy metals per unit volume of chelating resin. Moreover, because the stability of the chelate of said iminodipropionic acid group or iminodi-α-methylpropionic acid group with heavy metal ions is relatively low, regeneration from an adsorbent with heavy metals is easy.

According to the process a high-performance chelating resin can be prepared, having a very high ability to absorb heavy metals. It is easily regeneratable, which has heretofore been inexpensively unattainable by conventional processes and is produced by a new process which is high in industrial practical value.

7 Claims, No Drawings

CHELATING RESIN AND PROCESS FOR PREPARING THE SAME

BACKGROUND OF THE INVENTION

Heretofore, various chelating resins have been developed with a view to selectively adsorbing heavy metals in the waste water. However, heavy metal pollution has become a well known problem, especially recently, causing a serious social problem. In concomitance with the strengthened regulation for the quality of waste water based on the Water Pollution Prevention Act, usefulness of chelating resins has risen increasingly, and development and commercialization of novel chelating resins have become active. In the field of chelating resins, the work that has been studied most broadly for a long time is the so-called type of iminodiacetic acid in which an N-methylene iminodiacetic acid group $$(-CH_2-N\diagdown ^{CH_2COOH}_{CH_2COOH})$$

is introduced into the aromatic nuclei of crosslinked styrene-divinyl benzene copolymer beads. A chelating resin of this type has many characteristics such as (1) high adsorbing capability for heavy metals, (2) excellent chelate-forming capability and selective adsorbing capacity for heavy metals, (3) high stability of chelate, and (4) regenerability.

With reference to the so-called type of iminodipropionic acid in which an N-methylene iminodipropionic acid group is introduced into the aromatic nuclei of crosslinked styrenedivinyl benzene copolymer beads, similar to this type of iminodiacetic acid, a few reports have been written (for example, G. Kuehn and E. Hoyer, Makromol. Chem., 108, 84 – 94 (1967) and Y. B. Trostyanakaya and G. Z. Nefedova, Vysokomol, Soyed. 5 (1), 49 – 56 (1963).

We have conducted a detailed examination with reference to the type of iminodipropionic acid, and have confirmed that characteristics which are about the same as those pointed out with respect to this type of iminodiacetic acid are present in this type also. It becomes clear that of said characteristics, with respect to the stability of chelate, the type of iminodipropionic acid shows a value considerably lower than that of the type of iminodiacetic acid. Indeed, the type of iminodipropionic acid is such that it shows a relatively low stability of chelate with heavy metal ions in spite of its high ability to absorb heavy metals. The fact that the stability of the chelate is lower means that the conditions for elution of heavy metals from an adsorbent with heavy metals become easier. In fact, it has been confirmed that regeneration of the type of iminodipropionic acid is easier than that of the type of iminodiacetic acid. This characteristic of easy regeneration is very important for a chelating resin in the sense that it has a long recycle lifetime when it is utilized as an adsorbent for water treatment.

For synthesizing a chelating resin of this type of iminodipropionic acid, the following may be cited by way of example:

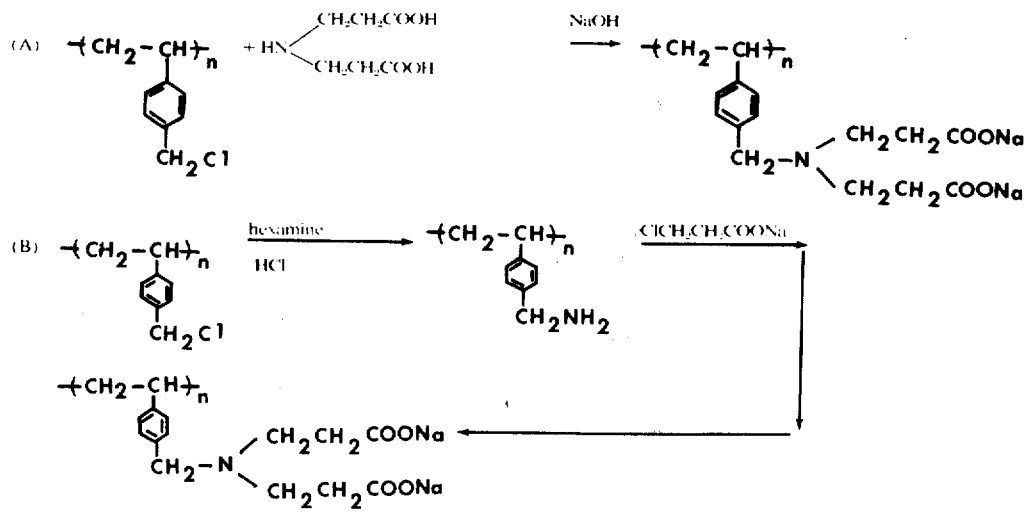

Of the above two processes (A) and (B), process (B) is complicated in its reaction step. Moreover, at the stage of introducing sodium-$\beta$-chloropropionate to amino methylated polystyrene (also because this is a polymer reaction), it is quite difficult simultaneously to introduce two propionic acid groups thereto, though it is relatively easy to introduce one propionic acid group per amino group. The process (B) has the drawback that it is not possible to form an iminodipropionic acid group effectively. Therefore, this process has almost no practical value.

On the other hand, the process (A) is theoretically practicable. However, because the polymer-matrix having a chloromethyl group is hydrophobic, it does not simply react with a water-soluble nucleophile such as iminodipropionic acid or sodium iminodipropionate, and it is actually difficult to practice this process.

One means for improving process (A) is (C) to make the polymer-matrix hydrophilic in advance. A few proposals have been made, including Japanese Patent Application Publication Nos. 691 1962, 3699/1965, 28414/1971 and 28514/1971.

This process (C) is considerably effective. However, on the other hand, the number of reaction steps increases and an excess of reaction by-products must be removed. Thus, the production step becomes complicated, and process (C) is not necessarily satisfactory in respect of reaction yield and ability to absorb heavy metals of the chelating resin produced.

For improving the process (A), another procesd (D) has been suggested. This consists of using a hydrophobic compound (specifically iminodipropionitrile or alkyl iminodipropionate, etc.) as a source of iminodipropionic acid, reacting the same with a chloromethylated polystyrene matrix in the presence of a swelling solvent and thereafter carrying out saponification to produce an iminodipropionic acid group on the aromatic rings. This is referred to, for example, in Y. B. Trostyanskaya and G. Z. Nefedova, Vysokomol. Soyed., 5 (1), 49 – 56 (1963).

Various reaction conditions with reference to the aforesaid process (D) were examined. It was found that this process is, to be sure, effective in introducing an iminodipropionic acid group to the polystyrene side chain. However, the reaction yield at the reaction stage of chloromethyl groups with imino groups reaches only a relatively high level, so that this process (D) is very unsatisfactory for synthesizing high-performance chelating resins.

We have now discovered that a novel chelating resin having excellent adsorbing ability for heavy metals, and having excellent regenerating ability, is obtained in a very effective reaction by using, as the compound to which the iminodipropionic acid group or iminodi-α-methylpropionic acid group is to be introduced, a polyalkylene polyamine derivative (hereinafter referred to as an intermediate of a functional group) having, in the molecule, at least one group selected from the class consisting of iminodipropionitrile, iminodi-α-methylpropionitrile, alkyl iminodipropionate and alkyl iminodi-α-methylpropionate, wherein the alkyl groups have 1 – 8 carbon atoms, and at the same time containing at least one primary and/or secondary amino group.

Further, it has been discovered that conditions for synthesizing the aforesaid intermediate of a functional group have certain characteristics, which will be disclosed in detail hereinafter. We have succeeded in unifying a step for synthesizing the intermediate of a functional group (hereinafter referred to as step S) together with an additional reaction step of the intermediate of a functional group to a crosslinked halomethylated polymer (hereinafter referred to as step H), with unexpected great benefit.

The following are characteristics of "step S" for synthesizing the intermediate of a functional group:
1. The reaction temperature, reaction pressure and stirring conditions are roughly similar to those of step H.
2. The reaction atmosphere and catalytic activity are basically similar to those of step H.
3. Partly because the reaction proceeds stoichiometrically, the amount of by-product is small, and this by-product does not obstruct step H.

SUMMARY OF THE INVENTION

The present invention provides a novel high-performance chelating resin having a crosslinked polymer structure whose main structural unit is the structure (I) or (II):

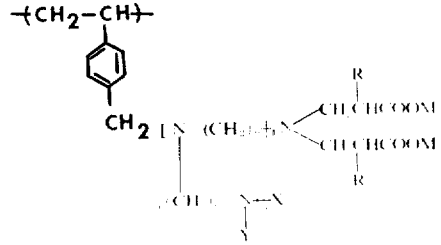

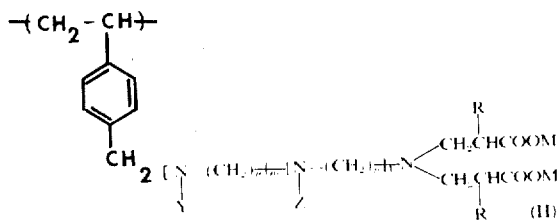

wherein $l$ represents an integer from 1 – 8, $m$ represents an integer from 0 – 8, $n$ represents an integer of 2 – 12, M represents hydrogen, a univalent alkali metal ion such as sodium, potassium or lithium, or $NH_4^+$, R represents hydrogen or methyl, X, Y and Z each represents hydrogen or a group selected from the class consisting of alkyl having 1 – 8 carbon atoms, hydroxyalkyl having 1 – 8 carbon atoms, aromatic having 6 – 9 carbon atoms, aralkyl group having 7 – 10 carbon atoms and —A—COOM, wherein A stands for divalent alkyl residual group having 1 – 8 carbon atoms and M has the aforementioned meaning.

Further, the present invention provides a process for preparing an easily regeneratable, high-preformance, novel chelating resin having a crosslinked polymer structure whose main structural unit is the aforesaid structure (I) and/or (II), which process comprises reacting a halomethyl group bonded to aromatic nuclei of a crosslinked polymer consisting mainly of an aromatic vinyl monomer with a polyalkylene polyamine derivative having in the molecule at least one kind of group selected from the class consisting of iminodipropionitrile, iminodi-α-methylpropionitrile, alkyl iminodipropionate and alkyl iminodi-α-methyl propionate wherein the alkyl groups have 1 – 8 carbon atoms, at the same time, having at least one primary and/or secondary amino group in the presence of a swelling solvent, and thereafter carrying out hydrolysis of the reaction product in the presence of an acid or alkali to produce at least one of group selected from the class consisting of iminodipropionic acid, iminodi-α-methylpropionic acid, inimodipropionate and iminodi-α-methylpropionate. Hereinafter, this process will be referred to as the "first synthesizing process."

Further, the present invention provides a process for preparing an easily regeneratable, high-performance, novel chelating resin having a crosslinked polymer structure whose main structural unit is the aforesaid structure (I) and/or (II), which process comprises reacting simultaneously a halomethyl group bonded to aromatic nuclei of a crosslinked polymer consisting mainly of an aromatic vinyl monomer with (A) a polyalkylene polyamine derivative having in the molecule at least one primary amino group and one secondary amino group and (B) at least one kind of unsaturated compound selected from the class consisting of acrylonitrile, methyacrylonitrile, alkyl acrylate and alkyl methacrylate wherein the alkyl groups have 1 – 8 carbon atoms in the presence of a swelling solvent, and thereafter carrying out hydrolysis of the reaction product in the presnce of an acid or alkali to produce at least one group selected from the class consisting of iminodipropionic acid, iminodi-α-methylpropionic acid, iminodipropionate and iminodi-α-methylpropionate. Hereinafter, this process will be referred to as the "second synthesizing process."

Examples of the processes of the present invention are shown by chemical reaction formulae, as follows:
According to the first synthesizing process of the present invention, as compared with the aforesaid pro-
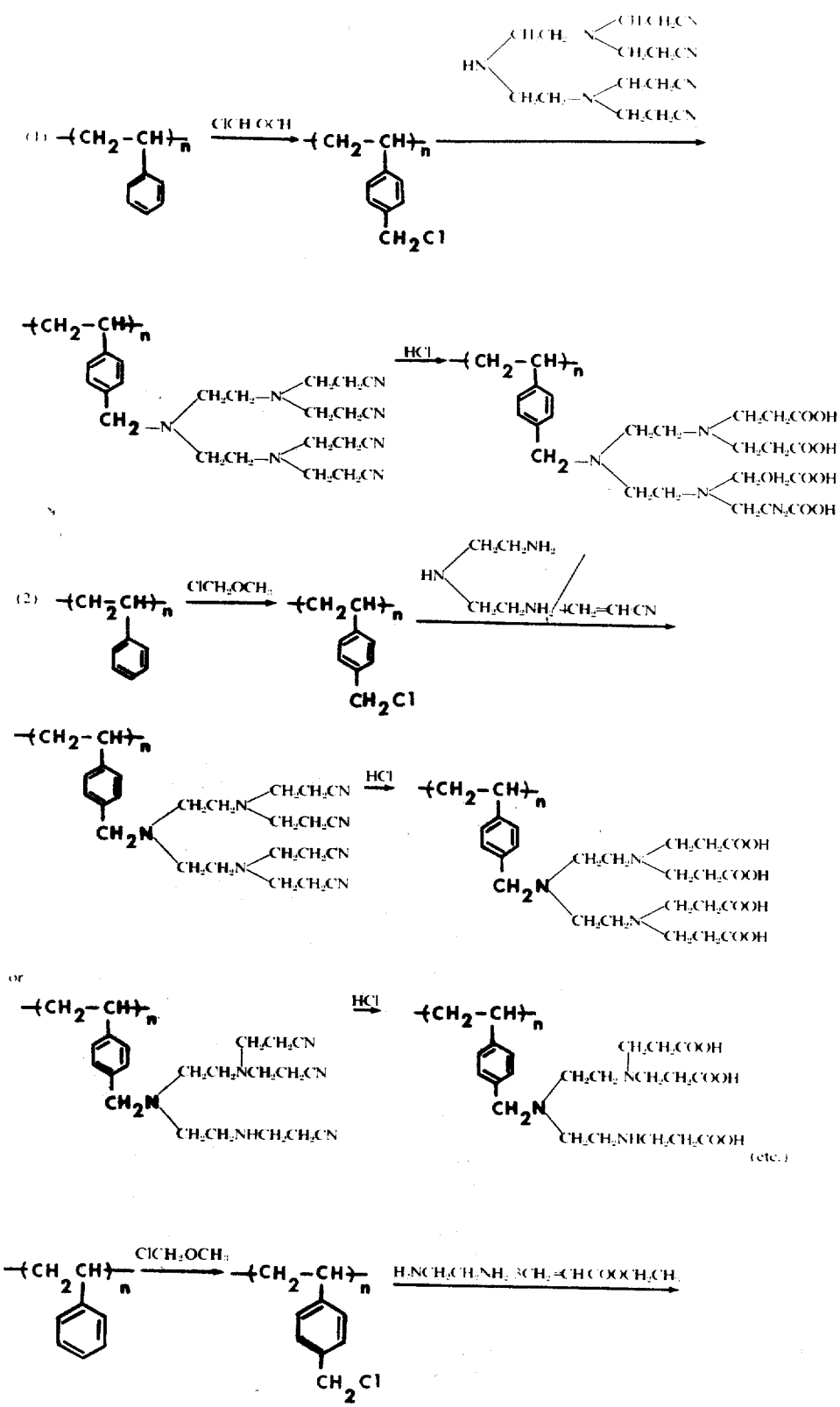

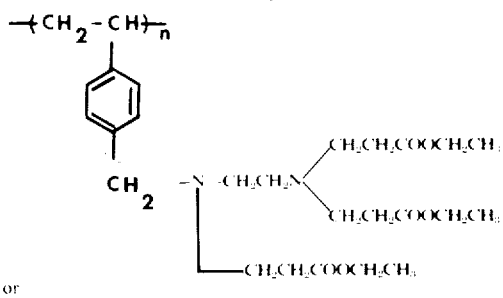

or

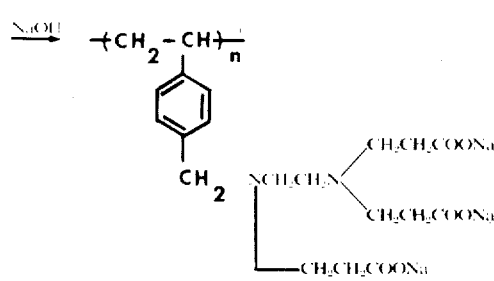

cess (D), it is possible to introduce at a high reaction yield and more effectively an iminodipropionic acid group or an iminodi-α-methylpropionic acid group to aromatic nuclei on polystyrene side chains, which is believed to be due mainly to the following reasons: the imino groups of the iminodipropionitrile, iminodi-α-methylpropionitrile, alkyl iminodipropionate and alkyl iminodi-α-methylpropionate acquire reduced basicity under the influence of electron-withdrawing groups

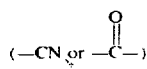

and the reactivity of the secondary hydrogen is reduced as compared with the conventional secondary amines, said primary or secondary amino group has a relatively high basicity, because the primary or secondary amino group in the polyalkylene polyamine derivative containing at least one group selected from the class consisting of iminodipropionitrile, iminodi-α-methylpropionitrile, alkyl iminodipropionate and alkyl iminodi-α-methylpropionate and at least one primary and/or secondary amino group of the present invention is chemical-structurally separated from the iminodipropionitrile group, iminodi-α-methylpropionitrile group, alkyl iminodipropionate group and alkyl iminodi-α-methylpropionate group by an alkylene group in the molecule. It is considered that such primary or secondary amino group maintains a high reactivity as nucleophile reagent because of that.

The second synthesizing process of the present invention has the advantage that by adding, en masse or in portions, a mixture of polyalkylene polyamine derivative (component A) and an α,β-unsaturated monomer such as acrylonitrile (component B) in a composition corresponding to the objective functional group [for example, in the case of said reaction example (2), adjusting the molar ratio of diethylene triamine to acrylonitrile to 1/4] in a swelling solvent containing a cross-linked halomethylated polystyrene, it is possible to carry out a synthetic reaction of an intermediate of a functional group (step S) and an introductory reaction of the polystyrene side chain to aromatic nuclei (step H) in the same reactor. Moreover, after completion of the reaction, it is possible to separate the resulting resin by filtration and to recover the unreacted component and solvent from the filtrate by, for example, distillation, for re-use. Accordingly, the second synthesizing process of the present invention has the capability of simplifying the reaction process including the reaction step and the after-treatment step, shortening the entire reaction period and preparing a high-performance chelating resin having an iminodipropionic acid group or an iminodi-α-methylpropionic acid group economically, in which sense the second synthesizing process drastically rationalizes the first synthesizing process.

A crosslinked polymer consisting mainly of an aromatic vinyl monomer which may be used in the present invention (hereinafter referred to as a "base resin") may be prepared by polymerizing a mixture of an aromatic vinyl monomer such as styrene, vinyl toluene, α-methyl styrene, ethylvinyl benzene, isopropylvinyl benzene, ethylvinyl toluene, ar-chlorovinylbenzene and ar-chlorovinyl toluene with a crosslinking agent such as divinyl benzene, divinyl toluene, divinyl pyridine, divinyl naphthalene, trivinyl benzene, trivinyl naphthalene, diallyl dicarboxylate such as diallyl adipate and diallyl phthalate, methylene bis acrylamide and ethylene glycol dimethacrylate in the presence of an ordinary initiator of radical polymerization such as benzoyl peroxide, lauroyl peroxide, t-butyl peracetate, t-butyl perbenzoate, azobisisobutyronitrile and azobiscyclohexanenitrile. At this time, it is possible to replace a part of said aromatic vinyl monomer by other non-aromatic vinyl monomers. It is appropriate that the amount of the crosslinking agent added upon preparing this base resin is 0.2 – 20 (preferably 0.5 – 15) % by weight based on the weight of the base resin produced.

The shape of the base resin of the present invention is not particularly limited and may include beads, film, blocks, flakes or powders. However, when utilized as a chelate adsorbent for general use, beads are especially preferred. Base resin beads may be prepared easily by suspension polymerization (in water) of a mixture of an aromatic vinyl monomer, a cross-linking agent and a radical polymerization initiator in the presence of an inorganic compound which is hardly soluble in water or in a water-soluble polymer. When utilized in a manner requiring mechanical strength, porous base resin beads are useful base resins.

Introduction of a halomethyl group into the base resin is easily accomplished by, for example, reacting a mixture of paraformaldehyde with hydrogen chloride, chloromethylether or bromoethylether with the base resin in the presence of a catalyst of the Friedel-Crafts type such as zinc chloride, stannic chloride or aluminum chloride. The reaction is ordinarily carried out at 20° – 60° C, by which reaction 2 – 15 (ordinarily 5 – 10) units of halomethyl groups are introduced to 10 units of aromatic nuclei in the base resin.

Polyalkylene polyamine derivatives (intermediate of a functional group) having in the molecule at least one group selected from the class consisting of iminodipropionitrile, iminodi-α-methylpropionitrile, alkyl iminodipropionate and alkyl iminodi-α-methylpropionate wherein the alkyl groups have 1 – 8 carbon atoms, and at the same time having at least one primary and/or secondary amino group which may be used in the first synthesizing process of the present invention is a compound represented by the following general formulas (III) or (IV).

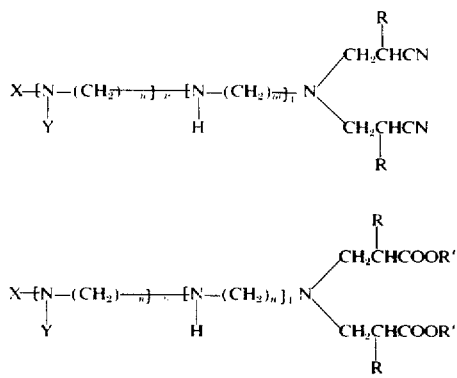

wherein $m$ represents an integer from 0 – 8, $n$ represents an integer from 2 – 12, $l$ represents an integer from 1 – 8, R represents hydrogen or a methyl group, R' represents an alkyl group having 1 – 8 carbon atoms, and X and Y each represent hydrogen, an alkyl group having 1 – 8 carbon atoms, a cyanoalkyl group having 2 – 8 carbon atoms, a carboalkoxy alkyl group having 2 – 18 carbon atoms, a hydroxyalkyl group having 1 – 8 carbon atoms, an aromatic group having 6 – 9 carbon atoms and an aralkyl group having 7 – 10 carbon atoms.

Examples of these intermediates of functional groups (III) are shown by the following chemical structural formulae.

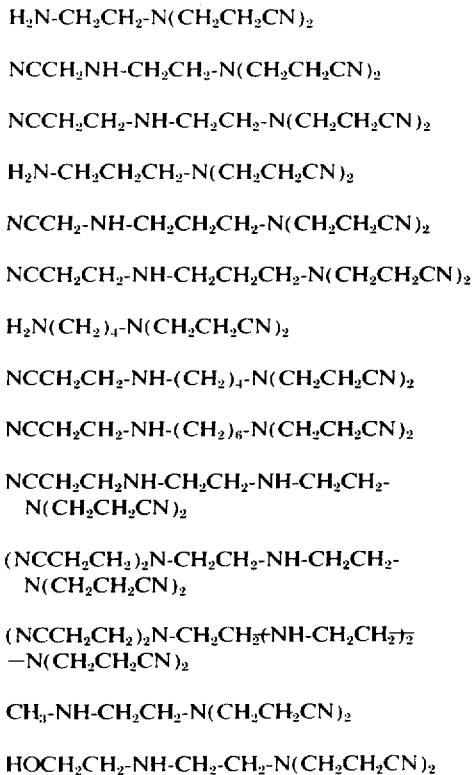

These intermediates of functional groups may ordinarily be synthesized by properly combining $HN(CH_2CH_2CN)_2$, $NH_3$, $CH_2NH_2$, $Cl(CH_2)_nCl$, $HOCH_2CH_2Cl$, $H_2NCH_2CH_2CN$. In other processes, examples (3), (6), (8), (9), (10), (11) and (12) may be synthesized easily and very inexpensively simply by using the Michael addition reaction of acrylonitrile with commercially available polyalkylene polyamines. Therefore, the processes of the present invention are very practical and valuable.

As examples of intermediates having functional group (IV), the products obtained by substituting for the respective —CN group a —$COOCH_3$ group or a —$COOC_2H_5$ group may be cited, and these esters may be synthesized easily by blowing a dry hydrogen chloride gas into a methanol or ethanol solution of said nitrile compounds.

In the case of the second synthesizing process which carries out simultaneously a synthetic reaction of an intermediate of a functional group (step S) and an introductory reaction of polystyrene side chain to aromatic nuclei (step H) in the same reactor without synthesizing the intermediate of the functional group in advance, it is possible to use a polyalkylene polyamine derivative represented by the following general formula (V) and acrylonitrile, methacrylonitrile, alkyl acrylate whose alkyl group has 1 – 8 carbon atoms or alkyl methacrylate whose alkyl group has 1 – 8 carbon atoms (hereinafter referred to as the unsaturated compound for the Michael reaction).

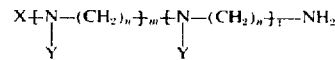

wherein $l$ and $m$ each represent an integer from 0 – 8, $n$ is an integer from 2 – 12, X and Y each represents hydrogen, alkyl group having 1 – 8 carbon atoms, carboalkoxy alkyl group having 3 – 18 carbon atoms, a hydroxyalkyl group having 1 – 8 carbon atoms, an aromatic group having 6 – 9 carbon atoms and an aralkyl group having 7 – 10 carbon atoms.

The reaction of an intermediate of a functional group in the first synthesizing process, a polyalkylene polyamine derivative (component A) in the second synthesizing process or an unsaturated compound for the Michael reaction such as acrylonitrile (component B) with a crosslinked halomethylated polymer base resin may be practiced in the presence of a swelling solvent such as benzene, toluene, ethyl benzene, chlorobenzene, carbon tetrachloride, 1,1,1-trichloroethane, tetrachloroethane, ethylene dichloride, dioxane, tetrahydrofuran and dimethyl formamide at a reaction temperature of about 20° – 200° C for a reaction period of about 0.5 – 100 hours. At this time, a reaction catalyst is not necessarily required. However, when a strong base catalyst such as caustic alkali or an alkali metal alkoxide is used, the reaction rate is accelerated, which is advantageous.

Hydrolysis of a nitrile or ester group of an intermediate of a functional group introduced to the side chain of the base resin may be practiced easily by utilizing an aqueous reaction using a strong acid such as hydrochloric acid or sulfuric acid or a strong base such as caustic alkali at a reaction temperature of about 30° – 200° C (preferably about 50° – 120° C). For example, when such a nitrile or ester group is treated in concentrated hydrochloric acid under reflux conditions for about 4 – 8 hours, it is possible to obtain about 100% hydrolysis.

Hereinbelow, the present invention will be explained in further detail by reference to examples. These will refer to a selective adsorption test for cupric ion, which is used for testing the performance of the chelating resin of the present invention.

In this test, a 300 ml beaker, 130 ml of Clark-Lubs buffer solution having a pH of 6, 20 ml of 0.1 M cupric sulfate aqueous solution and 4.5 g of sodium chloride were placed. Thereafter, 0.50 g of a chelating resin was added thereto, and the resulting mixture was stirred by a magnetic stirrer. After carrying out two adsorption reactions for two different predetermined times (1 hour and 2 hours), two different samples of supernatant liquid were taken by means of a 15 ml pipette from this mother liquid.

Next, 85 ml of distilled water were added to 15 ml of each sample, the resulting mixture was neutralized with 1 N sodium hydroxide, and subsequently 2 ml of a buffer solution of ammonium chloride and ammonium hydroxide having a pH of 10 were added to the resulting mixture. Four or five drops of a pyrocatecol indicator were added to the resulting mixture, and it was titrated with a 0.05 molar EDTA standard solution to determine the amount of residual cupric ion in the mother liquid.

EXAMPLE A— Preparation of the base resin (No. 1)

Letting "$a$" be any number less than 1000, a mixture containing (1,000 – $a$) grams of styrene, $a$ grams of divinyl benzene in technical grades (consisting of approximately 55% by weight of divinyl benzene and approximately 45% by weight of ethylvinyl benzene), 5 grams of benzoyl peroxide, 2 liters of deionized water, 20 grams of poly(sodium methacrylate), 20 grams of sodium dihydrogen phosphate and 100 grams of sodium chloride was charged into a 5-liter autoclave equipped with a theromometer, a nitrogen gas inlet tube and a mechanical stirrer. After replacing air in the upper space with nitrogen, the autoclave was sealed and suspension polymerization was carried out with stirring under the nitrogoen atmosphere at 100° C for 8 hours.

The polymerization mixture was then cooled and the base resin beads were separated by filtration. The degree of crosslinking of the resulting base resin was 0.055 $a$%.

EXAMPLE B— Preparation of base resin (No. 2): Macro-reticular type

A mixture of 818 g of styrene, 182 g of divinyl benzene in technical grades (consisting of approximately 55% by weight of divinyl benzene and approximately 45% by weight of ethylvinyl benzene), 5 g of benzoyl peroxide, 1 liter of isooctane, 3 liters of deionized water, 30 g of poly(sodium methacrylate), 30 g of sodium dihydrogen phosphate and 30 g of sodium chloride was charged into a 10-liter autoclave equipped with a thermometer, a nitrogen gas inlet tube and a mechanical stirrer. After the air in the upper space was replaced with nitrogen, the autoclave was sealed and suspension polymerization was carried out in the autoclave at 80° C for 10 hours and at 90° C for 10 hours. Subsequently, the resulting polymer beads were boiled in hot water to eliminate the isooctane and to produce opaque porous base resin beads.

The degree of crosslinking of the resulting base resin was 10% and the specific surface area of the base resin measured by a BET type surface area measuring apparatus (nitrogen gas adsorbing method) was 26 $m^2/g$ - dry resin.

EXAMPLE C— Preparation of a halomethylated base resin

In a 10-liter glass-lined autoclave equipped with a thermometer, a reflux condenser, a nitrogen gas inlet tube and a mechanical stirrer were charged 5 liters of chloromethylether and 1,000 g of the base resin beads which were obtained in the above Example A or B. The mixture was kept under nitrogen at 50° C for 2 hours with stirring, allowing the beads to swell sufficiently with chloromethylether.

Then, 250 g of anhydrous powdered zinc chloride were added in small portions over a period of 1 hour, after which the reaction was carried out with stirring at 60° C for 4 hours.

The resulting light yellowish beads were filtered off and washed with acetone and water in order to decompose the zinc chloride and to remove the excess of chloromethylether.

The content of the chloromethyl group in the resin beads were determined by measuring the content of the chlorine according to the method of JIS K-5580. It was shown that 9 – 10 units of chloromethyl groups were introduced per 10 units of aromatic nuclei initially contained in the base resin.

EXAMPLE 1

Into a 1-liter, four-necked flask equipped with a thermometer, a reflux condenser and a mechanical stirrer were charged 700 ml of dioxane and 50 g of chloromethylated base resin beads (containing 0.3 mole of chloromethyl group) which were prepared in accordance with the aforementioned Example C via A, the degree of crosslinking of which was 2.75% ($a$ = 50g) and the average diameter of which was 0.25 – 0.50 mm. The mixture was kept under nitrogen at 100° C for 1 hour with stirring, allowing the beads to swell sufficiently with dioxane. Then, 315 g (1 mole) of N,N,N'', N''-tetra (2-cyanoethyl) diethylene triamine, the intermediate of functional groups which was prepared by the Michael reaction of diethylene triamine with acrylonitrile, were introduced into the flask, and the mixture was kept at a reflux temperature for 15 hours with stirring. The reaction mixtures were then cooled and filtered. Light yellowish brown reaction products were obtained after washing with acetone and water.

The resulting reaction products were placed in a 1-liter, four-necked flask equipped with a thermometer, a reflux condenser and a mechanical stirrer. Then, 500 ml of concentrated hydrochloric acid were added and the mixture was stirred at a reflux temperature for 5 hours to hydrolyze the nitrile groups of the intermediate of functional groups introduced to the side chain on the base resins. The reaction mixtures were filtered and the resulting resin beads were thoroughly washed with water and immersed in an aqueous solution of sodium hydroxide in order to convert the carboxylic acid groups in the functional groups into sodium carboxylate groups. The final products were washed with water until no further pink color was detected with a phenolphthalein indicator.

It was confirmed that the nitrile groups in the beads were hydrolyzed completely by infrared spectrum analysis with almost no residual cyano groups detected. The final beads contained 1.64 mmole/g - dry resin of chelate-forming functional groups, the content of the carboxyl group corresponded to 6.56 m eq./g - dry resin, which were determined from the nitrogen contents by the Micro-Dumas method. The rate of conversion turned out to be as high as 97.5% of the theoretical amount based on the initial chloromethyl groups contained. The resulting chelating resin showed 1.46 mmole/g - dry resin (1 hour of adsorption time) and 1.63 mmole/g - dry resin (2 hours of adsorption time) of the selective adsorbing capacity for cupric ions. From these results, it was determined that the selective adsorbing capacity for cupric ions was as high as 0.249 mole (2 hours of adsorption time) per unit mole of carboxyl groups.

In order to examine the elution properties of cupric ions from the saturated chelating resin with cupric ions, a deadsorbing test was carried out in aqueous solution at pH 2.0 as a batch operation. The degree of deadsorption was as high as 97.3% (2 hours of deadsorption time) of the total amount of the adsorbed cupric ions and they were regenerated easily at a very high yield. 0.5 N hydrochloric acid was fed as a regenerant at a rate of SV value of 2 1/1 - resin.hr. by column operation to a bed of chelating resin saturated by cupric ions. When the amount of 1 1/1 - resin of 0.5 N hydrochloric acid as the regenerant was passed through the column, it was found that the degree of regeneration of the resin bed in the column reached as high as 72.7%.

These results demonstrated that the process of this example gave a very effective way of introducing functional groups (consisting of diethylene triamine containing two iminodipropionic acid groups) and that the resulting chelating resin had not only a high selective absorbing capacity for heavy metal ions, e.g. cupric ions in the presence of a large amount of alkali metal ions, but also ease of regeneration under mild conditions as compared to other chelating resins.

COMPARATIVE EXAMPLE 1

Example 1 was repeated, except using 123 g (1 mole) of iminodipropionitrile instead of 315 g (1 mole) of N,N,N'',N''-tetra (2-cyanoethyl) diethylene triamine as an intermediate of functional groups. The amount of functionl groups of the resulting sodium iminodipropionate type resin, determined by nitrogen analysis, was 2.29 mmole/g - resin (the content of the carboxyl group corresponded to 4.57 m eq./g - resin), which was as low as 73.3% of the theoretical amount based on the amount of the initial chloromethyl group.

And the selective adsorbing capacity of this resin for cupric ions was 0.96 mmole/g - dry resin (2 hours of adsorption time) and the adsorbed mount of cupric ions per unit mole of carboxyl groups was as small as 0.210 mole (2 hours of adsorption time). Accordingly, when iminodipropionitrile was used as an intermediate of functional groups, the ratio of introduction of functional groups to the halomethylated base resin was relatively poor and accordingly the capability of selective adsorbtion of cupric ions was rather unsatisfactory.

COMPARATIVE EXAMPLE 2

When the elution properties of cupric ions from an adsorbent for cupic ions was examined under exactly the same conditions as in Example 1 using "Diaion CR-10" manufactured by Mitsubishi Kasei Co., Ltd. of Japan as a resin having an iminodiacetate group as chelate-forming functional groups, the degree of desorption of cupric ions at pH 2.0 was 18.3% (2 hours of desorption time) and the degree of regeneration of the resin by 0.5 N hydrochloric acid was as low as 27.5%.

As compared with the iminodipropionic acid of Example 1, the iminodiacetic acid was slow with respect to desorption speed of cupric ions, and in order to elute cupric ions completely, it was necessary to make the pH lower, or to use a larger amount of the regenerant, resulting in compelling strict conditions to the resin for regeneration; therefore, it had the drawback that the recycle lifetime was shorter.

COMPARATIVE EXAMPLE 3

Into a flask the same as in Example 1 were charged 50 g of chloromethylated base resin beads (the content of the chloromethyl group of which was 0.3 mole) and 20 ml of chloroform, the resulting mixture was stirred at 60° C for 1 hour to swell the base resin beads. Subsequently, 400 ml of chloroform and 60 grams (0.43 mole) of hexamine were added into the flask and refluxed for 4 hours with stirring. The reaction products were filtered off and transferred into another flask, to which 150 ml of concentrated hydrochloric acid and 700 ml of ethyl alcohol were added. The resulting mixture was refluxed with stirring for 4 hours. Thereafter, the resulting resin was filtered and washed to obtain a base resin to which an aminomethyl group had been introduced. The amount of functional groups contained in the base resin wasa 3.01 mmole/g - dry resin as a result of nitrogen analysis. Next, in a separately prepared 1-liter flask, 87 g of β-chloropropionic acid was precisely neutralized with sodium hydroxide, continuously 38 g of the aforesaid aminomethylated base resin and 300 ml of ethyl alcohol were added into the flask, and the resulting mixture was reacted at 80° C for 20 hours while an aqueous solution of sodium hydroxide was added thereto in a manner to keep the reactants always weakly alkaline. The reaction product was filtered, washed with water and ethyl alcohol and dried. The selective adsorbing capacity for cupric ions was measured. It was as low as 0.21 mmole/g - dry resin (2 hours of adsorption time). And the number of carboxyl groups per unit functional group introduced, determined by measuring the exchange capacity of an ordinary weakly acidic ion exchange resin, was 1.25. Accordingly, the degree of formation of the iminodipropionic acid groups was as low as 12.5% of the initial quantity of amino groups.

Although the reaction yield at the stage of converting a halomethylated group to an aminomethyl group wasa not so poor, it was relatively easy to introduce one propionic acid group to the amino group at the stage of adding sodium β-chloropropionate to crosslinked aminated polystyrene. However, it was difficult simultaneously to introduce two propionic acid groups. And it was not possible to form an iminodipropionic acid group effectively.

COMPARATIVE EXAMPLE 4

The selective adsorbing capacity for cupric ions was measured using "Diaion pk 228" manufactured by Mitsubishi Kasei Co., Ltd. of Japan as the strongly acidic cation exchange resin and "Amberlite IRC-50" manufactured by Rohm and Haas Co. as the weakly acidic cation exchange resin. However, in the presence of large amounts of alkali metal ions, adsorption of cupric ions took place only very slightly.

COMPARATIVE EXAMPLE 5

In a flask the same as that in Example 1 were charged 50 g of chloromethylated base resin beads (the content of the chloromethyl group was 0.3 mole) and 700 ml of dioxane, and the mixture was stirred at 100° C for 1 hour to swell the resin. 103 g (1 mole) of diethylene triamine were added continuously into the flask, and the resulting mixture was reacted at a reflux temperature with stirring for 8 hours. The reaction product was filtered and washed with water and methanol to obtain a resin to which diethylene triamine groups had been introduced. The amount of functional groups contained in this resin was 2.88 mmole/g - resin, which was relatively large as a result of nitrogen analysis, however, the selective adsorbing capacity for cupric ions was as small as 0.34 mmole/g - dry resin, much too low for practical performance.

When the polyalkylene polyamine functional group that was introduced contained no iminodipropionic acid group, the product had very poor ability to form a stable chelate with cupric ions as a heavy metal selectively in the presence of a large amount of alkali metal ions and to adsorb cupric ions.

EXAMPLE 2

Example 1 was repeated, except using 360 g (1 mole) of N,N,N'-tri (carboethoxyethyl) ethylene diamine synthesized by blowing a dry hydrogen chloride gas into an ethanol solution of N,N,N'-tri (2-cyanoethyl) ethylene diamine which was obtained by the Michael addition reaction of acrylonitrile with ethylene diamine as an intermediate, instead of 315 g (1 mole) of N,N,N'',N''-tetra (2-cyanoethyl) diethylene triamine. The amount of functional groups in the resulting chelating resin, determined by nitrogen analysis, was 2.06 mmole/g - dry resin (the content of the carboxyl group corresponded to 6.18 m eq./g - dry resin), which showed the reaction yield was as high as 94.5% of the theoretical amount based on the initial amount of the chloromethyl group.

The selective adsorbing capacity for cupric ions was as high as 1.38 mmole/g - dry resin (1 hour of adsorption time) and 1.59 mmole/g - dry resin (2 hours of adsorption time).

The selective adsorbing capacity for cupric ions per unit mole of carboxyl groups was as high as 0.257 mole (2 hours of adsorption time).

As such, a chelating resin produced by hydrolyzing functional groups derived from ethylene diamine having an ethyl iminodipropionate group was high in introductory reaction yield of the functional group thereof and selectively adsorbed cupric ions as a heavy metal ion in the presence of a large amount of alkali metal ions.

EXAMPLE 3

In a 1-liter, four-necked flask equipped with a thermometer, a reflux condenser and a mechanical stirrer were charged with 50 g of chloromethylated base resin beads having a degree of crosslinking of 2.75% and an average diameter of 0.25 – 0.50 mm, obtained in Example C via A (the content of the chloromethyl group was 0.30 mole). 500 ml of dioxane, and the resulting mixture was stirred at 100° C for 1 hour to swell the base resin sufficiently. A mixture of 103 g (1 mole) of diethylene triamine and 212 g (4 moles) of acrylonitrile was added dropwise continuously to the resulting mixture. After completion, the resulting mixture was reacted with stirring continuously at a reflux temperature for 15 hours.

Subsequently, the reaction product was filtered and washed with water and acetone to obtain a light yellowish brown bead. When this reaction product was pulverized and subjected to infrared adsorption spectrum analysis, a sharp absorption peak based on the cyano group was detected in the vicinity of 2240 cm$^{-1}$, and it was confirmed that the acrylonitrile used was added to diethylene triamine by the Michael addition reaction. At the same time, it was introduced to the aromatic nuclei of the side chain of the crosslinked polystyrene.

Next, the entire amount of the reaction product was charged in another 1-liter, four-necked flask equipped with a thermometer, a reflux condenser and a mechanical stirrer, into which 500 ml of concentrated hydrochloric acid was added. The resulting mixture was reacted at a reflux temperature with stirring for 5 hours to hydrolyze the nitrile group of an intermediate of functional groups introduced to the side chain of the base resin. Subsequently, the reaction product was filtered, thoroughly washed with water and thereafter immersed in an aqueous solution of sodium hydroxide to convert the carboxylic acid of the functional group into sodium carboxylate.

When the resulting reaction product was pulverized and subjected to an infrared adsorption spectrum analysis, the residual cyano group was barely detectable, and it was confirmed that hydrolysis was almost complete. The amount of functional groups in the resulting chelating resin, determined by nitrogen analysis, was 1.65 mmole/g - dry resin, which showed the reaction yield was as high as 97.7% of the theoretical amount based on the initial amount of the chloromethyl group. The quantity of carboxyl groups in the resin determined by measuring the exchanging capacity of an ordinary weakly acidic ion exchange resin was 5.95 m eq./g - dry resin. The yield of the Michael addition reaction of acrylonitrile diethylene triamine introduced to the base resin, calculated from said value, was as high as a 90.1%.

The selective adsorbing capacity for cupric ions of the resulting chelating resin was 1.44 mmole/g - dry resin (1 hour of adsorption time) and 1.63 mmole/g - dry resin (2 hours of adsorption time), and the selective adsorbing capacity for cupric ions per unit mole of the carboxyl groups, was as high as 0.274 mole (2 hours of adsorption time).

As such, it was found that the chelating resin obtained by simultaneously reacting diethylene triamine and acrylonitrile with crosslinked chloromethylated polystyrene, and thereafter hydrolyzing the reaction product with hydrochloric acid, had at least 2 carboxyl groups per single introduced functional group, and introductory reaction yield of functional groups thereof and the degree of formation of the iminodipropionic acid group thereof were high. They had excellent ability to form a chelate with cupric ions as the heavy metal ion in the presence of a high concentration of alkali metal ions, and to adsorb the cupric ions thereby.

EXAMPLE 4

Example 1 was repeated except for using macroreticular type resin beads having a degree of crosslinking of 10% obtained in Example C via B as the base resin to obtain a chelating resin. The amount of functional groups of this chelating resin, determined by nitrogen analysis, was 1.04 mmole/g - dry resin (the content of the carboxyl group corresponded to 4.16 m eq./g - dry resin), which showed the reaction yield was as high as 87.4% of the theoretical amount, based on the initial amount of the chloromethyl group. The selective adsorbing capacity for cupric ions was as high as 1.20 mmole/g - dry resin (2 hours of adsorption time).

EXAMPLES 5 – 10

When a flask and a base resin the same as in Example 1 were used and reaction conditions were varied as shown in Table 1, a high-performance chelating resin was obtained at a high yield in each example. Table 1 shows the results actually obtained.

EXAMPLES 11 – 12

When a flask and a base resin the same as in Example 3 were used and reaction conditions were varied as shown in Table 2, a high-performance chelating resin was obtained at a high yield in each example. Table 2 shows the results actually obtained.

Table 1

| Example | Intermediates of functional group | Functional groups of the finally resulting chelating resins |
|---|---|---|
| 5 | NCCH$_2$CH$_2$NHCH$_2$CH$_2$N(CH$_2$CH$_2$CN)$_2$ | −CH$_2$NCH$_2$CH$_2$N(CH$_2$CH$_2$COONa)$_2$ <br> \| <br> CH$_2$CH$_2$COONa |
| 6 | H$_2$NCH$_2$CH$_2$N(CH$_2$CH$_2$CN)$_2$ | CH$_2$NHCH$_2$CH$_2$N(CH$_2$CH$_2$COONa)$_2$ |
| 7 | CH$_3$CH$_2$OCOCH$_2$CH$_2$NH(CH$_2$)$_2$N(CH$_2$CH$_2$COOCH$_2$CH$_3$)$_2$ | −CH$_2$N(CH$_2$)$_2$N(CH$_2$CH$_2$COONa)$_2$ <br> \| <br> CH$_2$CH$_2$COONa |
| 8 | HOCH$_2$CH$_2$NHCH$_2$CH$_2$N(CH$_2$CH$_2$CN)$_2$ | −CH$_2$NCH$_2$CH$_2$N(CH$_2$CH$_2$COONa)$_2$ <br> \| <br> CH$_2$CH$_2$OH |
| 9 | CH$_3$CH$_2$OCOCH$_2$CH$_2$NH(CH$_2$)$_2$NH(CH$_2$)$_2$N(CH$_2$CH$_2$COOCH$_2$CH$_3$)$_2$ | branched structure with CH$_2$CH$_2$COONa groups (see figure) |
| 10 | NCCH$_2$CH$_2$NHCH$_2$CH$_2$N(CH$_2$CH$_2$CN)$_2$ | −CH$_2$NCH$_2$CH$_2$N(CH$_2$CH$_2$COONa)$_2$ <br> \| <br> CH$_2$CH$_2$COONa |

| Example | Measured amount of functional groups introduced (mmole/g-R) | Theoretical amount of functional groups to be introduced (mmole/g-R) | Reaction yield (%) | Adsorbing capacity for cupric ions (mmole/g R) 1 hr | Adsorbing capacity for cupric ions (mmole/g R) 2 hr | Adsorbing capacity for cupric ions per unit carboxyl group (mole) | Remarks (Degree of crosslinking of base resin and hydrolysis condition) |
|---|---|---|---|---|---|---|---|
| 5 | 2.05 | 2.18 | 94.0 | 1.39 | 1.56 | 0.254 | 1.10% ("a" 20g) Hydrolysis with concentrated hydrochloric acid |
| 6 | 2.48 | 2.65 | 93.4 | 0.96 | 1.20 | 0.242 | 2.75% Hydrolysis with concentrated hydrochloric acid |
| 7 | 1.91 | 2.06 | 92.6 | 1.16 | 1.41 | 0.246 | 2.75% Hydrolysis with concentrated hydrochloric acid |
| 8 | 2.15 | 2.45 | 87.8 | 0.90 | 1.04 | 0.242 | 2.75% Hydrolysis with aqueous solution of sodium hydroxide |
| 9 | 1.89 | 2.00 | 94.3 | 1.15 | 1.37 | 0.242 | 1.10% ("a" 20g) Hydrolysis with aqueous solution of sodium hydroxide |
| 10 | 1.75 | 2.18 | 80.2 | 1.12 | 1.36 | 0.254 | 10.00% ("a" 100g) Hydrolysis with concentrated hydrochloric acid |

Table 2

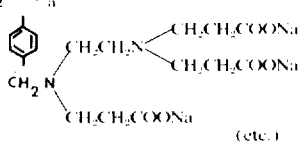

The following is claimed:

1. A chelating resin having a crosslinked polymer structure whose main structural unit is selected from the group consisting of the following (I) and (II)

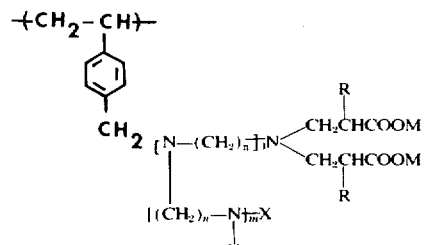

wherein $l$ is an integer from 1 – 8, $m$ is an integer from 0 – 8, $n$ is an integer from 2 – 12, M represents hydrogen, a univalent ion selected from the group consisting of sodium, potassium, lithium and $NH_4^+$, R designates hydrogen or a methyl group, X, Y and Z each represents hydrogen or a group selected from the class consisting of an alkyl group having 1 – 8 carbon atoms, a hydroxyalkyl group having 1 – 8 carbon atoms, an aromatic group having 6 – 9 carbon atoms, an aralkyl group having 7 – 10 carbon atoms and —A—COOM, wherein A represents a divalent alkyl residual group having 1 – 8 carbon atoms and M is as heretofore stated.

2. A chelating resin having a crosslinked polymer structure, the main structural unit of which is

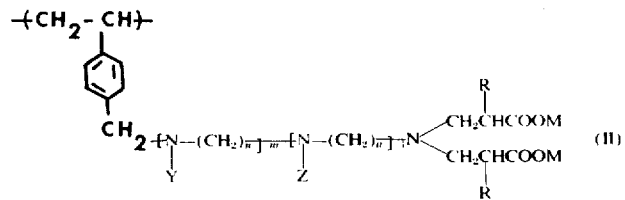

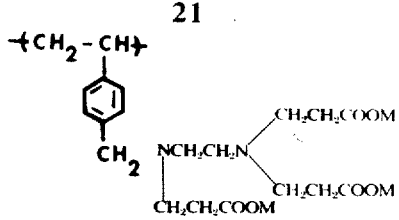

wherein M represents hydrogen or a univalent ion selected from the group consisting of sodium, potassium, lithium and $NH_4^+$.

3. A chelating resin having a crosslinked polymer structure whose main structural unit is

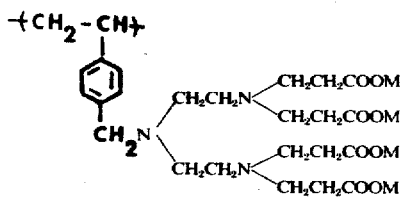

wherein M represents hydrogen or a univalent ion selected from the group consisting of sodium, potassium, lithium and $NH_4^+$.

4. A process for preparing a chelating resin having a crosslinked polymer structure whose main structural unit is selected from the group consisting of (I) and (II), which process comprises reacting a halomethyl group bonded to aromatic nuclei of a crosslinked polymer consisting mainly of an aromatic vinyl monomer with a polyalkylene polyamine derivative (intermediate of a functional group) having in the molecule at least one group selected from the class consisting of iminodipropionitrile, iminodi-α-methylpropionitrile, alkyl iminodipropionate and alkyl iminodi-α-methylpropionate wherein the alkyl groups have 1 – 8 carbon atoms, and at the same time, having at least one primary and/or secondary amino group in the presence of a swelling solvent, thereafter hydrolyzing the reaction product in the presence of an acid or alkali to produce at least one group selected from the class consisting of iminodipropionic acid, iminodi-α-methylpropionic acid, iminodipropionate and iminodi-α-methylpropionate, wherein said structural units (I) and (II) are:

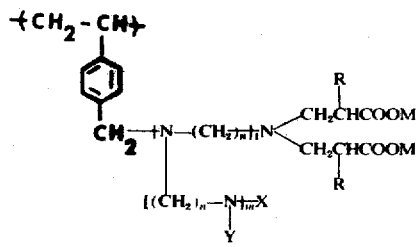

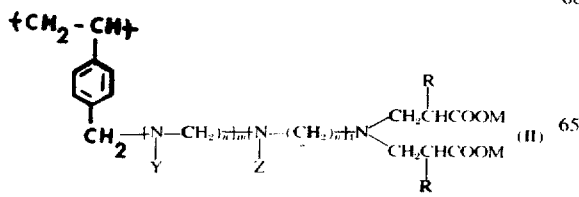

wherein $l$ is an integer from 1 – 8, $m$ is an integer from 0 – 8, $n$ is an integer from 2 – 12, M represents hydrogen, a univalent alkaline ion selected from the group consisting of sodium, potassium, lithium and $NH_4^+$, R designates hydrogen or a methyl group, X, Y and Z each represents hydrogen or a group selected from the class consisting of alkyl having 1 – 8 carbon atoms, hydroxyalkyl having 1 – 8 carbon atoms, aromatic having 6 – 9 carbon atoms, aralkyl having 7 – 10 carbon atoms and —A—COOM, wherein A represents a divalent alkyl residual group containing 1 – 8 carbon atoms.

5. A process for preparing a chelating resin having a crosslinked polymer structure whose main structural unit is hereinafter defined as a structure selected from the group consisting of (I) and (II), which process comprises reacting simultaneously a halomethyl group bonded to aromatic nuclei of a crosslinked polymer consisting mainly of an aromatic vinyl monomer with (A) a polyalkylene polyamine derivative having in the molecule at least one primary amino group and one secondary amino group and (B) at least one unsaturated compound selected from the group consisting of acrylonitrile, methacrylonitrile, alkyl acrylate and alkyl methacrylate wherein the alkyl groups have 1 – 8 carbon atoms in the presence of a swelling solvent, thereafter hydrolyzing the reaction product in the presence of an acid or alkali to produce at least one group selected from the class consisting of iminodipropionic acid, iminodi-α-methylpropionic acid, iminodipropionate and iminodi-α-methylpropionate, said structural units (I) and (II) being defined as follows:

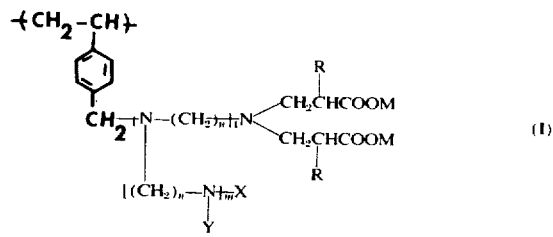

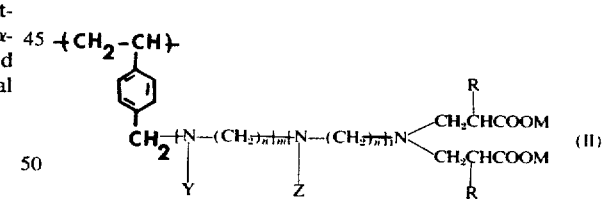

wherein $l$ is an integer from 1 – 8, $m$ is an integer from 0 – 8, $n$ is an integer from 2 – 12, M designates hydrogen, a univalent alkaline ion selected from the group consisting of sodium, potassium, lithium and $NH_4^+$, R represents hydrogen or a methyl group, X, Y and Z each represents hydrogen or a group selected from the class consisting of an alkyl group having 1 – 8 carbon atoms, a hydroxyalkyl group having 1 – 8 carbon atoms, an aromatic group having 6 – 9 carbon atoms, an aralkyl group having 7 – 10 carbon atoms and —A—COOM, wherein A represents a divalent alkyl residual group having 1 – 8 carbon atoms and M is as heretofore defined.

6. A process according to claim 4, wherein said intermediate of the functional group is

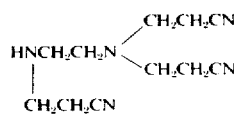

and/or

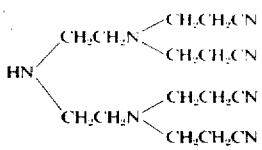

7. A process according to claim 4, wherein said cross-linked polymer consisting mainly of an aromatic vinyl monomer is substantially a copolymer of styrene and divinyl benzene in technical grade (consisting of approximately 40 – 80% of divinyl benzene and approximately 60 – 20% of ethylvinyl benzene).

* * * * *